United States Patent [19]
Jones

[11] 3,814,199
[45] June 4, 1974

[54] MOTOR CONTROL APPARATUS ADAPTED FOR USE WITH A MOTORIZED VEHICLE

[75] Inventor: William M. Jones, Shaker Heights, Ohio

[73] Assignee: Cleveland Machine Controls, Inc., Cleveland, Ohio

[22] Filed: Aug. 21, 1972

[21] Appl. No.: 282,467

[52] U.S. Cl............. 180/6.5, 180/77 H, 200/61.02, 250/229, 318/587
[51] Int. Cl............................................ B62d 11/04
[58] Field of Search.......... 180/6.5, 77 H; 46/244 C; 200/61.02; 318/587; 250/229

[56] References Cited
UNITED STATES PATENTS

| | | | |
|---|---|---|---|
| 3,100,860 | 8/1963 | Rosenthal | 180/6.5 X |
| 3,130,803 | 4/1964 | Wiggins | 180/6.5 |
| 3,481,417 | 12/1969 | Jarrett et al. | 180/6.5 |

*Primary Examiner*—David Schonberg
*Assistant Examiner*—John A. Pekar

[57] ABSTRACT

Motor control system for controlling both direction and speed of a DC motor. The system is particularly applicable for controlling direction and speed of a pair of DC reversible motors which independently drive spaced apart wheels on a vehicle, such as a motorized wheelchair. Motor speed is controlled in dependence upon the displacement of a joystick from a neutral position. The displacement is sensed by varying the amount of radiant energy received by a receiver in accordance with joystick movement. The receiver provides a motor speed control signal which has a magnitude that varies as a function of the joystick displacement from its neutral position. This control signal is applied to a motor speed control circuit for controlling the speed of at least one of the motor driven wheels. Motor direction is controlled in accordance with one embodiment by use of switches which are actuated as the joystick is displaced from its neutral position to indicate intended forward, reverse or turning movements. In accordance with other embodiments, of the invention, logic circuitry determines intended motor direction in dependence upon which one or ones of a plurality of energy beams are interrupted by a mask, movable relative to the beams in dependence upon joystick movement, or upon the amount of light received at plural light sensors when the transmitter is displaced relative thereto by the joystick.

10 Claims, 14 Drawing Figures

PATENTED JUN 4 1974

MOTOR CONTROL APPARATUS ADAPTED FOR USE WITH A MOTORIZED VEHICLE

This invention relates to the art of motor control and, more particularly, to controlling both speed and direction of a DC motor.

The invention is particularly applicable for controlling both speed and direction of a pair of DC motors used for driving the wheels of a motorized wheelchair and will be described with particular reference thereto, although it is to be appreciated that the invention has broader applications and may be used in various applications requiring control of both speed and direction of a DC motor.

Motorized wheelchairs are well known and typically include a pair of battery powered reversible DC motors for driving a pair of spaced apart wheels. A patient using such a wheelchair operates a joystick mechanism which may be universally displaced from a center-off position to mechanically actuate electrical switches, such as leaf spring switches or microswitches, to command a run-forward condition or a run-reverse condition, as desired. The joystick also mechanically actuates electrical switches to cause the DC motors to run in a fixed low speed or a fixed high speed. This, however, causes sudden speed changes and, hence, jerky movement of the wheelchair. In addition, such switches, whether used for motor direction control or motor speed control, have the disadvantage that they are subject to malfunction from dust conditions, burn-out conditions and other functional inabilities inherent in the use of mechanically actuated electrical switches.

Attempts have been made to provide non-complex speed control of such motorized wheelchairs to eliminate jerky movement inherent in the use of switches to provide fixed increments of power to the DC motors. One attempt takes the form of center-off potentiometers and a system of mechanical gimbles, shafts, levers and the like, so that as the joystick is displaced from its center-off position, control signals, which gradually vary in magnitude in dependence upon the displacement of the joystick, are provided to control speed. However, the use of such potentiometers and mechanisms results in a complex and akward structure, particularly when housed in a small assembly. In addition, such a complex mechanism introduces errors due to friction and other malfunctions inherent in mechanical assemblies, such as malfunctions due to dust, shock, misalignment and limited operating lifetime.

The primary object of the present invention is to provide improved speed control of a DC motor so that motor speed may be gradually varied over a range of motor speeds in dependence upon the relative displacement of a movable control member, such as a joystick.

It is a still further object of the present invention to provide apparatus for controlling the speed of a DC motor without the use of mechanically actuated switches, or the like, which result in fixed increments of power applied to the motor.

It is a still further object of the present invention to provide a motor control system wherein motor direction is controlled without the use of mechanically actuated switches and the like.

It is a still further object of the present invention to provide improved motor speed control of a motorized vehicle, such as a wheelchair, so that the speed of the vehicle may be smoothly varied over a range of speeds.

It is a still further object of the present invention to provide both speed and direction control for a motorized vehicle, such as a wheelchair, without the use of mechanically actuated switches and the like.

In accordance with one aspect of the present invention, it is contemplated that a motorized vehicle be electrically driven by means of a pair of independently rotatable wheels, each driven by a reversible DC motor. Both the speed and direction of the DC motors are controlled by a manually operable, universal movement joystick.

In accordance with this aspect of the present invention, motor direction control means are provided for controlling energization of the motors in dependence upon the relative position of the joystick to effect relative rotation between the wheels and thereby control the direction of movement of the vehicle. The motor speed is controlled over a range of speeds in dependence upon the magnitude of the speed control signal. The speed control signal is provided by a speed control circuit which includes a radiant energy transmitter for transmitting radiant energy, such as a beam of light, and a radiant energy receiver, which may include a light detector for providing a control signal having a magnitude which varies in dependence upon the amount of energy received. Also, the amount of transmitted energy that has been received by the receiver is varied, as with a mask or by mounting either the transmitter or the receiver to the joystick, in dependence upon the relative position of the joystick so as to thereby vary the magnitude of the speed control signal and, hence, the speed of the vehicle.

In accordance with a more limited aspect of the invention, the radiant energy transmitter and receiver are employed for both the control of motor speed as well as motor direction.

In accordance with another aspect of the present invention, there is provided an improved motor control system for purposes of controlling both motor direction and speed of at least one reversible DC motor. In this aspect of the invention, a manually operable member, such as a joystick, has a normal or neutral position and is movable therefrom in at least first and second opposite directions representative of forward and backward motor direction. The motor direction is controlled in response to detection of a forward displacement or a backward displacement of the joystick to cause either forward or backward motor rotation. The motor speed is controlled over an increasing range of speeds as the joystick is moved away from its neutral position, with the motor speed being varied in dependence upon the magnitude of a speed control signal. A speed control signal is provided which varies as a function of joystick displacement from its center position. This is obtained with a radiant energy transmitter, for transmitting radiant energy, and a receiver for receiving the energy and developing a control signal which varies in dependence upon the magnitude of the energy received. The amount of transmitted energy that is received by the receiver is varied, as with the use of a mask or by mounting either the transmitter or the receiver to the joystick, as the joystick is displaced from its neutral position.

The foregoing and other objects and advantages of the invention will become more readily apparent from the following description of the preferred embodiments of the invention as taken in conjunction with the accompanying drawings which are a part hereof and wherein.

Figure 1:
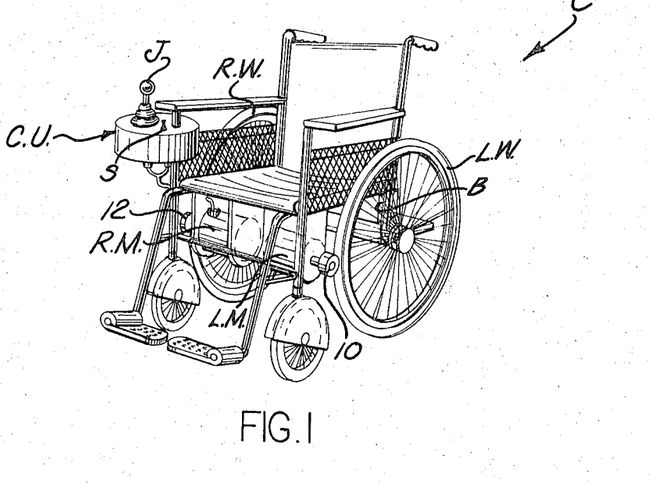
FIG. 1 is a perspective view illustrating a motorized wheelchair to which the present invention may be applied.

Referring now to the drawings wherein the showings are for purposes of illustrating preferred embodiments of the invention only and not for purposes of limiting same, FIG. 1 illustrates a wheelchair C of standard configuration. The wheelchair is provided with a left wheel LW and a right wheel RW mounted on opposite sides of the chair frame in such a manner that the wheels are independently rotatable in a manner well known in the art. The left wheel LW and the right wheel RW are respectively driven by reversible DC motors LM and RM suitably secured to the frame of the wheelchair, such as under the seat rest as shown in FIG. 1. The rotational forces provided by the output shafts of motors LM and RM are transmitted to wheels LW and RW by friction rollers 10 and 12. These friction rollers are respectively mounted to the output shafts of motors LM and RM and serve to respectively engage the periphery of wheels LW and RW to provide friction drive. Power for motors LM and RM is obtained from a battery B, suitably carried by the wheelchair in a convenient location, such as under the seat rest as is shown in FIG. 1. A control unit CU is mounted to the frame of the wheelchair and is provided with a joystick J which is easily operated by a patient riding the wheelchair. The control unit includes electrical circuitry which interconnects battery B with the drive motors RM and LM and serves, upon actuation of a toggle switch S to its ON position, to control both the motor speed and direction in in dependence upon the position of joystick J.

Figures 2, 3, 4:
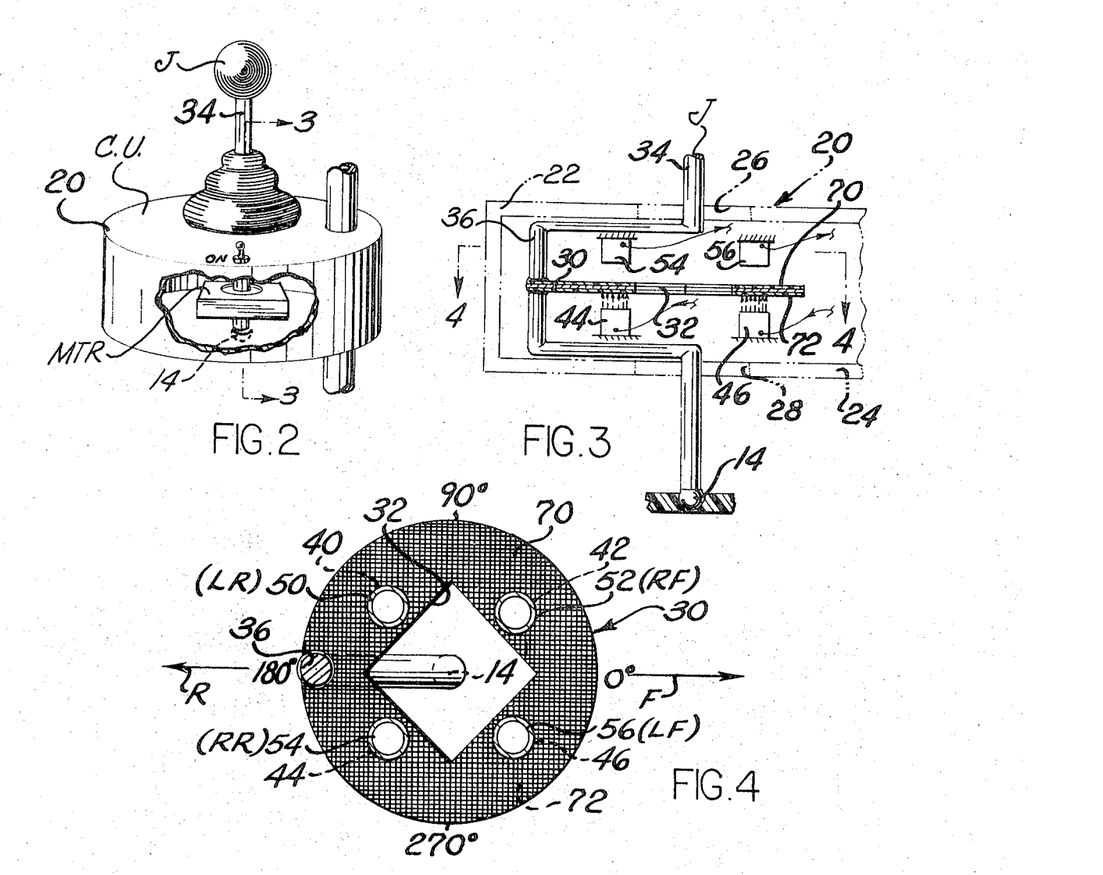
FIG. 2 is a fragmentary view with parts broken away showing the joystick mechanism.
FIG. 3 is an elevational view showing one embodiment of the mask, transmitter and receiver assembly constructed in accordance with the present invention.
FIG. 4 is a sectional view taken along line 4—4 in FIG. 3 looking in the direction of the arrows.

As shown in FIG. 2, the control unit CU provides a pivotal mounting 14 for the lower end of joystick J so that the joystick is permitted a universal pivotal movement from its normal, neutral or centered position. A mask, transmitter and receiver assembly MTR is mounted within the control unit housing such that a portion of the joystick shaft extends through the assembly. As will be described hereinafter, the mask, transmitter-receiver assembly MTR serves to detect both the direction and extent of joystick displacement from its normal centered position for purposes of controlling the direction and speed of motors LM and RM.

Figure 5:
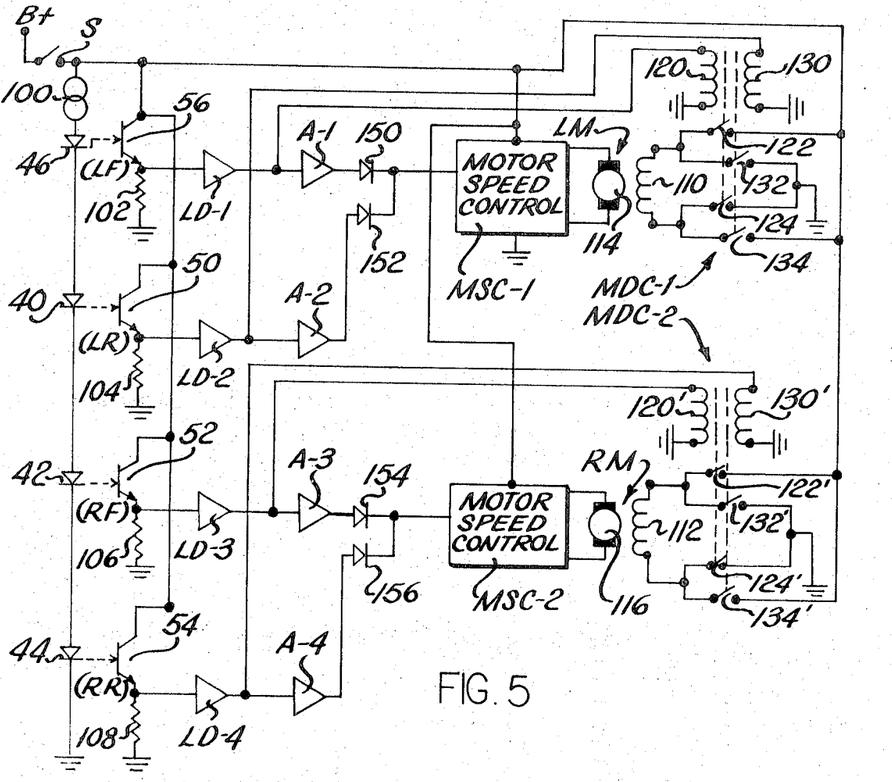
FIG. 5 is a combined schematic-block diagram illustration of the preferred form of the transmitter-receiver and accompanying circuitry for controlling both motor speed as well as motor direction without the use of mechanically actuated switches.

Reference is now made to FIGS. 3, 4 and 5 which illustrate one embodiment of the mask, transmitter-receiver assembly MTR. As shown in these FIGURES, assembly MTR includes a housing 20 having upper and lower walls 22 and 24 which are respectively provided with aligned apertures 26 and 28. These apertures receive portions of the length of joystick J so that the joystick may be pivoted for universal movement about its pivot connection 14 from its neutral position, as is shown in the patent drawings. In this embodiment, a mask 30, constructed in accordance with the invention, is mounted to the joystick for movement therewith. Mask 30, as shown in FIGS. 3 and 4 is a circular disk having its center portion cut away to define a centered square shaped aperture 32. Preferably, disk 30 is mounted to the joystick J so that it defines a plane essentially perpendicular to the joystick shaft 34. Also, the circular periphery of the disk shaped mask is preferably coaxially aligned with the shaft and this may be accomplished as shown in FIG. 3 by providing an elbow 36 in the shaft where it is contained within housing 20. Mask 30 is secured to elbow 36 at a point adjacent its peripheral edge as is best shown in FIGS. 3 and 4.

A light transmitter is mounted to housing 20 on one side of mask 30 and a light receiver is mounted on the opposite side of mask 30. The light transmitter may take various forms, such as a single source of light focused upon fiber optic tubing which is fanned out to provide four spaced apart light beams. Preferably, however, the transmitter includes four spaced apart light emitting diodes 40, 42, 44 and 46. Two of these diodes 44 and 46 are seen in FIG. 3 and all of the diodes are indicated with the dashed leader lines in FIG. 4. The light emitting diodes are spaced from and located below mask 30 and each serves to project a beam of light toward the mask with the beams being essentially perpendicular with respect to the mask, when the joystick is in its centered position. From FIG. 4 it will be noted that the light emitting diodes are arranged so that the axes of the transmitted beams define four corners of a square centered about the center of mask 30, when the joystick J is in its neutral position, with the defined square being oriented at an angle rotated by essentially 45° from the square aperture 32 in the mask. Also, the light beams projected by diodes 40, 42, 44 and 46 strike the mask, when in its centered position, to define circular illuminated areas on the surface of the mask at points spaced adjacent the sidewalls of aperture 32. The receiver, located on the opposite side of mask 30, includes four light responsive transistors 50, 52, 54 and 56 mounted to housing 20. The light responsive transistors 50, 52, 54 and 56 are arranged so as to be in registry with and to receive the light beams projected from the light emitting diodes 40, 42, 44 and 46 respectively.

When the joystick J is in its centered or neutral position, as shown in FIGS. 3 and 4, the light beams transmitted by diodes 40, 42, 44 and 46 are completely blocked by mask 30. To ensure that spurious light reflections are not detected by the light responsive transistors, the inner walls of housing 20 may be coated with an opaque light absorbing material and similarly the inner walls of the control unit housing CU may also be coated in this manner. Still further, the upper and lower surfaces of mask 30 may be coated with opaque light absorbing material, as indicated by the upper and lower layers 70 and 72 on disk 30 (see FIG. 3).

With switch S placed in its "on" position, all of the transmitting light emitting diodes 40, 42, 44 and 46 are energized to transmit light beams toward their respective light responsive transistors 50, 52, 54 and 56. The mask blocks the transmitted light beams from being received by the light responsive transistors. However, as the joystick is displaced from its neutral or center position, mask 30 is displaced to cause at least one of the light beams to be at least partially received by its associated light responsive transistor. Each of the light responsive transistors is associated with a motor direction of one of the motors. Thus, if we consider the forward vehicle direction to correspond with mask movement in a forward direction, as indicated by arrow F, and reverse vehicle movement to be in an opposite direction, as indicated by the arrow R, then light responsive transistors 52 and 56 may be considered as controlling the left wheel forward movement LF and the right wheel forward movement RF. Similarly, transistors 50 and 54 control the left reverse wheel movement LR and the right reverse wheel movement RR. These functions are in a positive sense in that as more light is received by an associated sensor the function increases. Looking upon the movement of the mask in terms of polar coordinates, the forward direction is indicated by arrowhead F and may be considered as 0°. The reverse direction is indicated by arrowhead R and may be considered as 180°. Movement of the joystick in a direction straight upward in the paper would be 90° and in the opposite direction would be 270°. Consequently, movement of the joystick at 0° would cause illumination of the right forward transistor 52 and the left forward transistor 56 to cause the vehicle to move in a forward direction. Movement of the joystick at an angle of 45° would illuminate only transistor 52 to cause a half left turn by energizing the right wheel to move in a forward direction. Movement of the joystick in the 90° direction would cause illumination of transistors 50 and 52, causing the left wheel to be driven in a reverse direction and the right wheel to be driven in a forward direction so as to make a sharp left turn.

Reference is now made to FIG. 5, which schematically illustrates the control circuitry for controlling both the speed and direction of the left motor LM and the right motor RM in accordance with the operation of the mask, transmitter receiver MTR described hereinabove with reference to FIGS. 2, 3 and 4. This control circuit is actuated upon closure of the toggle switch S so as to connect the B+ voltage from the battery to provide operating power for the control circuit as well as for the left motor LM and the right motor RM. The light emitter diodes 40, 42, 44 and 46 are connected together in series, with a constant current source 100 of conventional design, so that upon closure of switch S a regulated constant current flows through the series connected diodes. Each diode provides a beam of light dependent on the magnitude of current flow therethrough and, consequently, with the diodes being connected together in series the light intensity of the light emitted is the same for all of the diodes. The light sensitive NPN transistors 50, 52, 54 and 56 are arranged so as to receive the light beams from their associated light emitting diodes 40, 42, 44 and 46, respectively. The collectors of the transistors are connected in common to the B+ voltage supply source through switch S and the emitters of the transistors are connected through respective load resistors 102, 104, 106 and 108 to ground. As is well known, the amount of current flow through this type of transistor increases as a function of the instantenous amount of light being received.

When mask 30 is in the position as shown in FIG. 4, essentially no light is received by the light sensitive transistors and, hence, essentially no output voltage is developed across the load resistors. As a light sensitive transistor receives more and more light from its light emitting diode, its output voltage as taken across its load resistor increases in magnitude. The control circuitry serves to respond to these load voltages to control both the direction and speed of the left motor LM and the right motor RM. Motors LM and RM may take various forms, such as shunt or series DC motors. For purposes of illustration, these motors are shown as simple shunt motors having field coils 110 and 112 respectively. The armatures 114 and 116 are provided with armature current which is varied in a known manner by motor speed control circuits MSC-1 and MSC-2 from the B+ voltage supply source as a function of the magnitude of a control signal applied thereto. The motor direction will be dependent upon the direction of DC current flow through field coils 110 and 112. For purposes of illustration, it will be assumed that field current flow in the downward direction, as viewed on the drawing, will be indicative of forward motor direction and the opposite current flow will be considered as backward motor direction. The motor direction control circuits MDC-1 and MDC-2 serve to control the direction of the field current through field windings 110 and 112, respectively. These motor control circuits are shown in simplified fashion herein as being merely relay controlled circuits. Thus, in motor control circuit MDC-1, upon energization of relay coil 120 its relay contacts 122 and 124 become closed to provide current flow in a forward direction through the field coil 110. Conversely, upon energization of relay coil 130 its relay contacts 132 and 134 become closed to provide current flow through the field winding 110 in the opposite direction. The motor control direction circuit MDC-2 is operated in the same manner and its components are shown with similar character references which are primed.

Motor direction control of the left motor LM is achieved by sensing whether the left forward light sensitive transistor 56 or the left reverse light sensitive transistor 50 produces an output signal indicative that the joystick has commanded movement such that the left motor should be driven in a forward direction or in a reverse direction. To ensure that spurious light reflections do not provide an indication of commanded directional movement, level detectors LD-1 and LD-2 are connected to receive the output voltages from load resistors 102 and 104. Received light below a given level is not considered and the output signals of the output detector will increase in magnitude above the given level in dependence upon the amount of light received by transistors 56 and 50 respectively. The left motor is driven in the forward direction when the output signal taken from the level detector LD-1 energizes relay coil 120 to cause the field current to flow through field winding 110 in the forward direction. Similarly, the left motor is driven in the reverse direction when the output signal taken from level detector LD-2 energizes the reverse movement relay coil 130. Level detectors LD-3 and LD-4 connected to the emitters of transistors 52 and 54 serve the same function as level detectors LD-1 and LD-2 and these level detectors have their outputs connected to the right motor forward relay coil 120' and the right motor reverse relay coil 130'.

The speed of motors LM and RM is dependent upon the magnitude of the signal applied to motor speed control circuits MSC-1 and MSC-2. The output circuits of level detectors LD-1 and LD-2 are connected to suitable amplifiers A-1 and A-2 to provide amplification of the output voltages taken from transistors 56 and 50. The greater signal will control the motor speed control circuit and this is achieved by connecting the output circuits of the amplifiers through an OR gate comprised of diodes 150 and 152 respectively connected to the outputs of amplifiers A-1 and A-2. The cathodes of the two diodes are connected in common and thence to the control signal input of the motor speed control circuit. Similarly, in the control of motor RM the outputs of level detectors LD-3 and LD-4 are amplified by amplifiers A-3 and A-4 which have their output signals applied to an OR gate comprised of diodes 154 and 156. These diodes have their cathodes connected in common to the control input of the motor speed control circuit MSC-2.

Depending on the direction and amount of displacement of the joystick J from its neutral position, one or more of the light sensitive transistors will receive light from its associated light emitting diode. Assume that movement has been commanded for a sharp left turn or in the 90° direction, then both light sensitive transistors 50 and 52 will provide output signals. The magnitudes of the output signals will be dependent upon the displacement in the 90° direction and, hence, the amount of light received by the two transistors. In this case, transistors 54 and 56 will receive essentially no light. Transistors 50 and 52 provide output signals of sufficient magnitude to be detected by level detectors LD-2 and LD-3. This will cause the left motor reverse relay coil 130 to be energized to drive the left motor LM in the reverse direction. Also, the right forward movement control relay 120' is energized to cause the right motor RM to be driven in its forward direction. This will result in a sharp left turn of wheelchair C.

MODIFICATIONS

Figure 6:
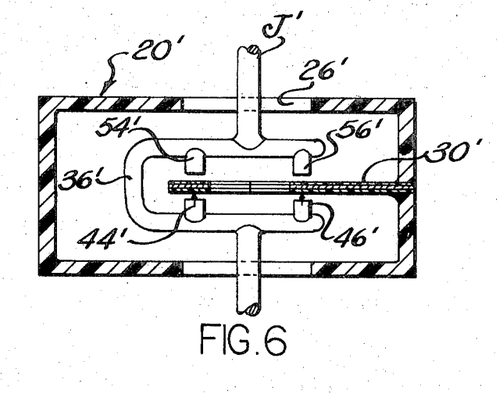
FIG. 6 is an elevational view showing another embodiment of the mask, transmitter and receiver assembly.

Mask 30 as described with reference to FIGS. 3 and 4 is mounted so as to be movable with the joystick J and the receiver-transmitter members are held stationary. The same functional control of the left motor LM and the right motor RM as described above can be achieved by keeping the mask stationary and mounting the transmitter-receiver members to the joystick so that these members move with the joystick. A modification of this nature is illustrated in FIG. 6, wherein housing 20' is constructed essentially in the same manner as housing 20 of FIG. 3, and joystick J' is provided with a U-shaped intermediate section 36'. The U-shaped intermediate section 36' serves to carry light emitting diodes 40', 42', 44' and 46' (only diodes 44' and 46' are visible in FIG. 6). Similarly, corresponding light receiving transistors 50', 52', 54' and 56' are carried on the upper portion of the U-shaped frame (only transistors 54' and 56' are visible in FIG. 6). Mask 30' is constructed in the same manner as mask 30, described with reference to FIGS. 3 and 4, and is mounted to housing 20' at a location adjacent its periphery so that the mask lies in a plane intermediate the transmitter and receiver members. As the joystick is displaced from its neutral position, as shown in FIG. 6, one or more of the light receiving transistors will receive sufficient light to provide an output signal to the motor control circuitry.

Figure 7:
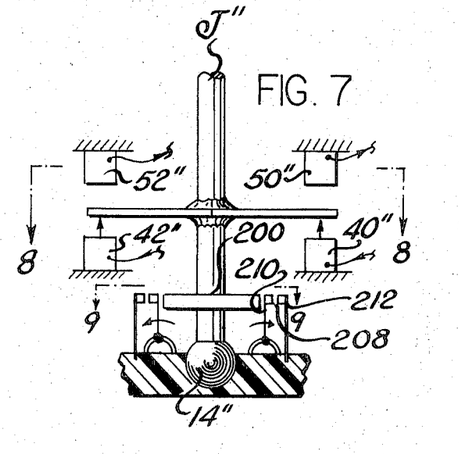
FIG. 7 is an elevational view illustrating a still further embodiment of the mask, transmitter and receiver assembly.
Figure 8:
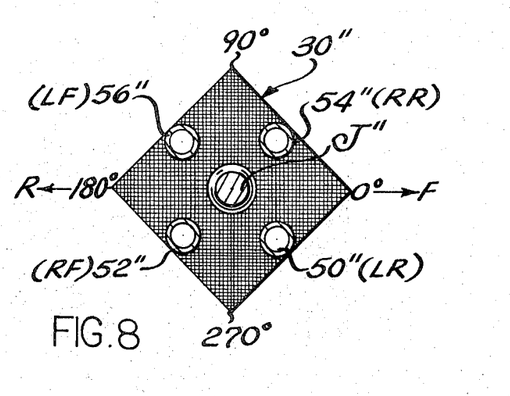
FIG. 8 is a sectional view taken along line 8—8 in FIG. 7 looking in the direction of the arrows.
Figure 9:
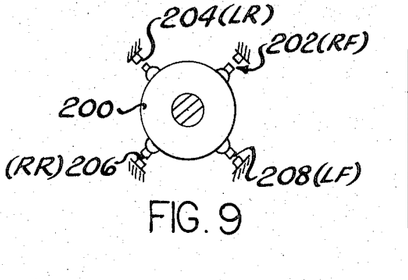
FIG. 9 is a sectional view taken along line 9—9 in FIG. 7 looking in the direction of the arrows.

Reference is now made to FIGS. 7, 8 and 9 which illustrates a still further modification of the invention wherein the mask 30" takes the form of a relatively flat square shaped member corresponding essentially with an enlarged version of the square shaped aperture 32 in mask 30, described with reference to FIG. 4. The mask may be stationary relative to the transmitter-receiver members or it may be mounted for movement with the joystick. As shown in FIG. 7, the mask 30" is mounted at a central point, as by a suitable adhesive, to joystick J" for movement therewith about a pivot connection 14". The light transmitting and receiving members are positioned in the same relationship to each other as in the previous embodiments. However, in this embodiment they are located relative to mask 30" so that the light beams are within the periphery of the square shaped member. As in the case of the previous embodiments when the joystick J" is in its centered position the four light beams are essentially fully blocked. The relative positions of the light receiving transistors 50", 52", 54" and 56" are shown in FIG. 8. The corresponding light transmitting diodes 40", 42", 44" and 46" are located on the opposite of mask 30" and are in registry with the receiving transistors. The locations of the transistors, however, are changed from that shown in FIG. 4 so that the transistors still perform the same motor control functions, as is indicated by the legends LR, RF, RR and LF adjacent the character references in FIG. 8.

A still further modification, in accordance with the invention, is to utilize the light transmitting and receiving members for speed control only and to employ mechanically actuated switches for direction control. Referring now to FIGS. 7 and 9, the joystick J" carries, at a point located adjacent its lower end, a switch actuator 200. Actuator 200 serves to mechanically actuate switches 202, 204, 206 and 208 respectively positioned at polar angles 45°, 135°, 225° and 315°. As best shown in FIG. 7, with respect to switch 208, each of these switches includes a movable switch contact 210 and a stationary contact 212. As joystick J'' is displaced from its neutral position it will actuate a movable contact 210 into engagement with its associated stationary contact 212 to thereby provide an electrical switch closure. Closure of switch 202 is indicative of a command that the right motor be driven in a forward direction whereas closure of switch 206 is indicative of a command that the right motor be driven in the reverse direction. Similarly, closure of switch 208 is representative of a command that the left motor be driven in a forward direction whereas closure of switch 204 is indicative of a command that the left motor be driven in a reverse direction. These motor direction functions are indicated by the legends LF, RF, LR and RR in parenthesis next to the character designations of these switches in FIG. 9.

Figure 10:
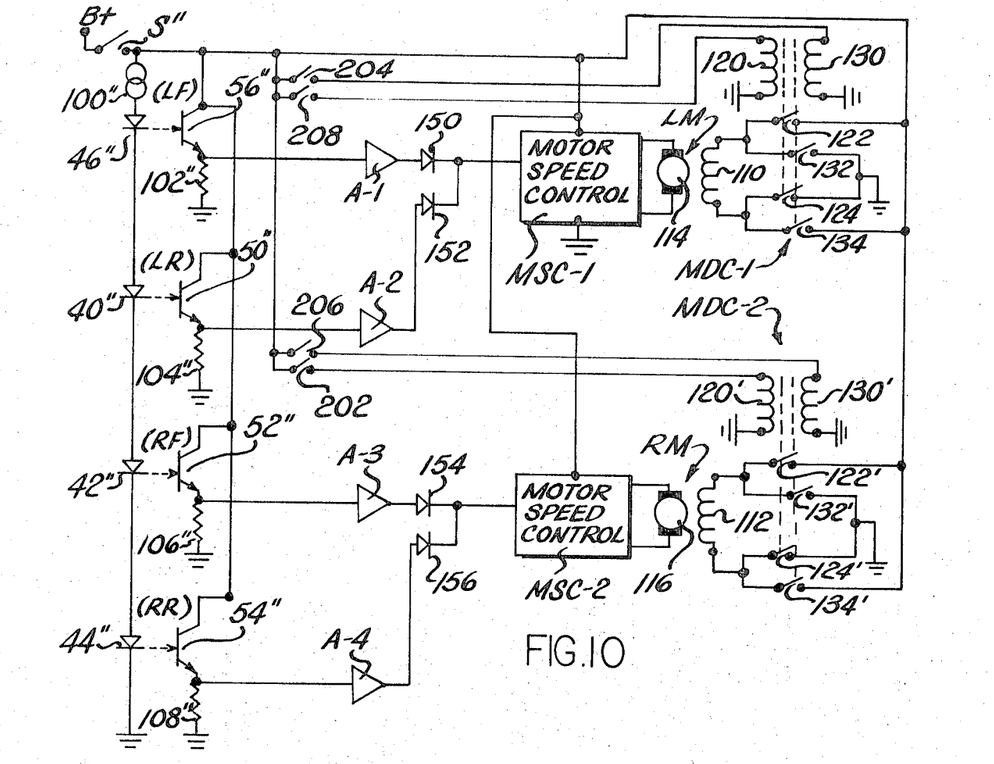
FIG. 10 is a combined schematic-block diagram illustration of a modified form of the transmitter-receiver circuitry in which the motor speed control is accomplished without the use of mechanically actuated switches.

Referring now to FIG. 10 there is illustrated circuitry for controlling the left motor LM and the right motor RM for both speed control as well as motor direction. The circuit is essentially identical with that illustrated in FIG. 5 and consequently like components are identified in both figures with like character references. The circuitry shown in FIG. 10, however, provides direction control in response to mechanical actuation of switches, such as those illustrated in FIGS. 7, 8 and 9. The motor direction control switches 202, 204, 206 and 208 (see FIG. 9) are schematically illustrated in FIG. 10 for, when respectively actuated, energizing the right motor forward relay coil 120', the left motor reverse coil 130, the right motor reverse relay coil 130' and the left motor forward control relay coil 120. These switches take the place of the level detectors LD-1 through LD-4. The transmitter diodes and receiving transistors are shown with double primes in FIG. 10 for association with the mask receiver-transmitter arrangement of FIGS. 7, 8 and 9. The operation of the circuitry is otherwise identical to that as described hereinbefore with respect to FIG. 5 and accordingly no further description is deemed necessary for those skilled in the art for a complete understanding of its operation.

Figure 11:
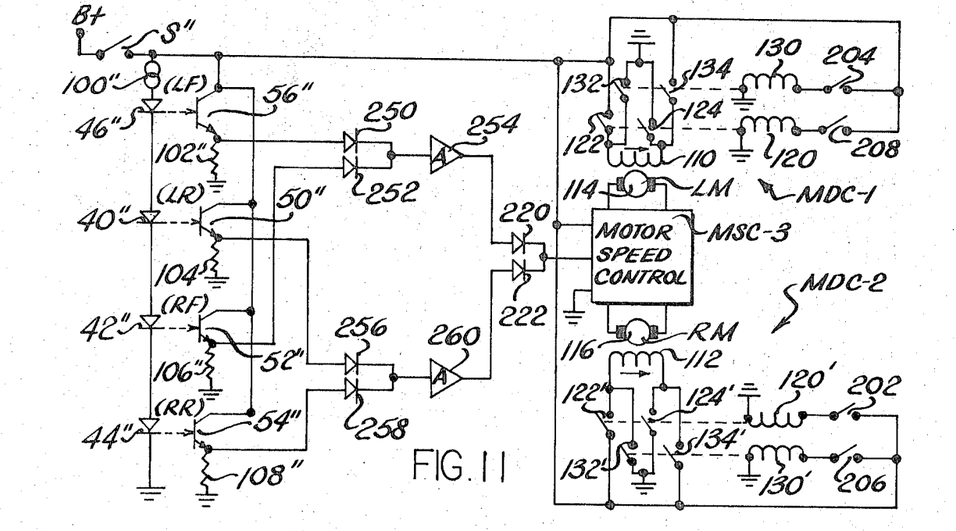
FIG. 11 is a combined schematic-block diagram illustration of a modified form of the transmitter-receiver employing a single motor speed control for both motors, with the speed control being accomplished without the use of mechanically actuated switches.

Reference is now made to the control circuitry of FIG. 11. This circuitry serves to control the speed and direction of the left motor LM and the right motor RM. As in the case of the circuitry shown in FIG. 10 the motor direction control is in response to mechanically actuated switches, such as switches 202, 204, 206 and 208 illustrated in FIG. 9. Consequently, the motor direction control circuits MDC-1 and MDC-2 are identical to that as illustrated in FIG. 10 and like components are identified with like character references.

The motor speed control portion of the control circuitry shown in FIG. 11 employs but a single motor speed control circuit MDC-3 which serves to control the armature current of both the left motor LM and the right motor RM in equal amounts so that when both motors are energized they rotate at the same speed. Motor speed control circuitry MSC-3 may take the same form as motor speed control circuits MSC-1 and MSC-2 described previously. The control signal for the motor speed control circuits MSC-3 is obtained from the output of an OR gate comprised of diodes 220, 222 having their cathodes connected in common to the control input of the motor speed control circuit.

The light emitting diode circuitry and the light receiving transistor circuitry of FIG. 11 is the same as that shown in FIG. 10 and consequently like components in both circuits are identified with like character references. In FIG. 11, however, the output signals obtained from the emitters of transistors 52'' and 56'' are applied through an OR gate comprised of diodes 250 and 252 so that the larger of the two output voltages is passed by the OR gate and amplified with a suitable amplifier 254. Similarly, the output voltages obtained at the emitters of transistors 50'' and 54'' are applied to an OR gate comprised of diodes 256 and 258 so that the larger of the two voltages is passed by the OR gate and amplified by a suitable amplifier 260. The output signals taken from amplifiers 254 and 260 are, in turn, applied to the OR gate comprised of diodes 220 and 222 so that the larger of the two voltages is used as the input control signal to the motor speed control MSC-3. Motor speed control MSC-3 controls the armature current in dependence upon the magnitude of the control signal and thereby control the speed of left motor LM and right motor RM.

In the operation of the circuitry shown in FIG. 11 the joystick J'' of the embodiment illustrated in FIGS. 7, 8 and 9 may be displaced in the forward direction. In such case, light sensitive transistors 52'' and 56'' will receive essentially equal amounts of light. Due to bias levels, etc., one of the signals will be slightly greater than the other and, hence, it will be passed by the OR gate and amplified by amplifier 254 so that the motor speed control MSC-3 drives the left motor and the right motor at a speed in dependence upon the amount of displacement of the joystick in the forward direction. With the joystick so displaced, the right forward and left forward switches 202 and 208 are actuated. Consequently, the motor direction control circuits will, in the same manner as described hereinbefore with reference to FIGS. 5 and 10, cause the field current to flow in a direction through the field windings 110 and 112 so that the two motors are driven in the forward direction. If, for example, a full left turn is intended, the joystick J'' will be displaced along the 90° polar axis and this will result in light being received by light sensitive transistors 50'' and 52''. Theoretically, both should be of equal magnitude, however, due to bias potentials and the like one of the signals will predominate and will be applied through the OR gate comprised of diodes 220 and 222 to control the motor speed control circuit MSC-3. Since a left turn is being made, however, switches 202 and 204 are closed whereas switches 206 and 208 are open. Consequently, the right motor will be rotated in the forward direction and the left motor will be rotated at an equal speed but in the reverse direction to achieve a full left turn movement. If desired, circuitry can also be provided which in this case would shut off the left motor so that a left turn is made by maintaining the left wheel at zero speed and turning the right wheel in the forward direction.

The invention has been described herein in conjunction with either a stationary mask or a movable mask. In either instance, it has been indicated that the mask is either a square shaped mask, as in FIG. 8, or a circular shaped disk with a square shaped aperture, as in FIG. 4. Configurations other than a square shaped mask or a square shaped aperture may be employed. For example, the aperture in mask 30 may take the form of an equilateral triangle and similarly, the mask 30" may be an equilateral triangle. If equilateral triangles be employed then only three transmitting light emitting diodes and three corresponding light sensitive transistors will be required. Other configurations may be employed in practicing the invention.

Still further, whereas the disclosed embodiments include a multiple beam light source, other versions may be used. For example, speed control may be achieved with a single beam source, with the beam being either normally completely interrupted or completely passed by a mask. As the mask is transversely displaced, in any direction, relative to the beam, the amount of light received by an associated light sensor will vary as a function of relative displacement. The amount of received light may be used to control motor speed. Motor direction, in this version, may be controlled with switches, such as the switch arrangement illustrated in FIGS. 7 and 9.

Figure 12:
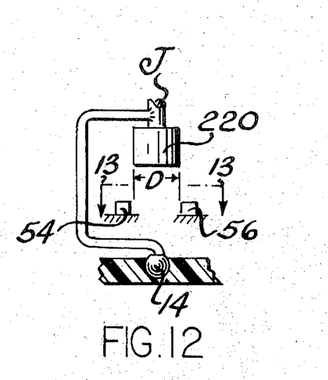
FIG. 12 is an elevational view showing another embodiment of the invention and which does not employ a mask.
Figure 13:
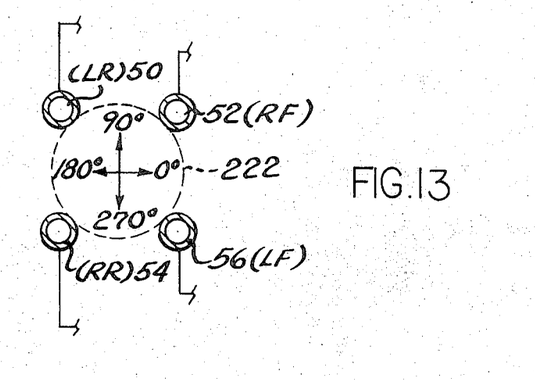
FIG. 13 is a sectional view taken generally along line 13—13 of FIG. 12 looking in the direction of the arrows; and, FIG. 14 is an elevational view showing a still further embodiment of the invention and which does not employ a mask.
Figure 14:
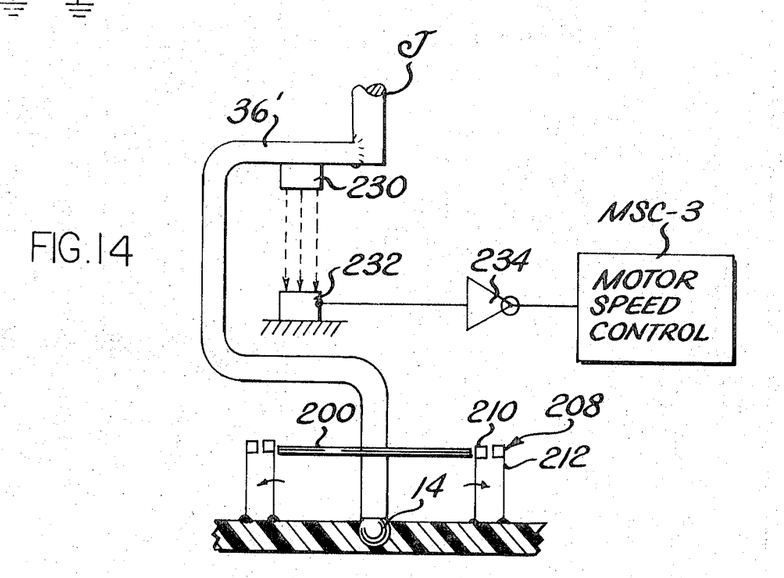

Reference is now made to the embodiments illustrated in FIGS. 12 through 14. These embodiments differ materially from the previously described embodiments by the absence of a mask between the light transmitter and the light receiver. Instead, the joystick serves to displace the transmitter and receiver relative to each other. In the embodiments illustrated, the light transmitter is mounted to the joystick for movement therewith and the light receiver is stationary. The embodiment illustrated in FIGS. 12 and 13 may be used for applications requiring that both the motor speed and motor direction be controlled by the light transmitter-receiver combination in the same sense as the embodiments discussed hereinbefore with reference to FIGS. 3, 4, 5, 6 and 10. The embodiment illustrated in FIG. 14 may be employed where only motor speed is to be controlled by the light transmitter-receiver combination, with the motor direction being controlled by switches, as in the embodiment shown, for example, in FIGS. 7, 8, 9 and 11.

Referring now to the embodiment of FIGS. 12 and 13, there is shown a single light source 220 which projects a collimated beam of light, having a circular diameter D, to define a circular area of illumination, as indicated by dotted lines 222 in FIG. 13. The light source 220 is secured, as by a suitable bond or clamping mechanism, to the joystick J. The joystick may be configured in the same manner as set forth in the embodiment of FIG. 3 and is pivoted for universal movement about its pivot connection 14 in the same manner as discussed hereinbefore. In this embodiment, the light sensors 52, 50, 54, and 56 are positioned so as to be spaced in quadrature at polar coordinates 45°, 135°, 225° and 315°, respectively. The sensors are positioned so as to be located just outside of the illuminated area 222 therebetween when the joystick is in its neutral or center position. With the sensors being arranged as shown in FIG. 13, the motors may be controlled with the circuitry as shown in FIG. 5 or FIG. 10.

Reference is now made to the embodiment shown in FIG. 14. A light transmitter 230, which may correspond with one of the light emitting diodes discussed hereinbefore, is secured, as by a suitable bond, to a joystick J. The joystick may be configured with an elbow portion in the same sense as the joystick J in FIG. 3. The light receiver includes a single light sensor 232 which, for example, may take the form of one of the light sensitive transistors illustrated and described hereinbefore. The light sensor is mounted so as to be stationary while the joystick J is pivoted about its pivot connection 14. It is contemplated that the embodiment in FIG. 14 employ a switch actuator and cooperating switches for controlling motor direction, as in the embodiment shown in FIGS. 7, 9 and 11. The switch actuator together with the corresponding switches are identified with same character references used in FIGS. 7, 9 and 11. The switches shown in FIG. 14 are interconnected for purposes of controlling motor direction in the manner shown in the circuit diagram of FIG. 11. The light sensor 232 takes the place of light sensors 50", 52", 54" and 56" and associated circuitry feeding the motor speed control MSC-3. Sensor 232 is oriented so that its surface is completely illuminated when the joystick is in a neutral or center position and is decreasingly illuminated as the joystick is displaced. Thus, the magnitude of the output signal from the transistor sensor will decrease as a function of joystick displacement from its center position. So that the sensor is compatible with the circuitry of FIG. 11, an inverter amplifier 234 is located in the output circuit taken from the emitter of sensor 232. In this manner, the control signal will vary in magnitude so as to be continuously increasing as the joystick is continuously displaced from its neutral position. Otherwise, the operation of the embodiment shown in FIG. 14 is essentially the same as that illustrated in FIGS. 7, 9 and 11.

In the embodiments described above with respect to FIGS. 12, 13 and 14, the light transmitter is secured to the joystick for movement therewith relative to a stationary light receiver. These functions may, however, be interchanged.

Whereas the invention has been described with reference to preferred embodiments it is to be appreciated that it is not limited to same as various additional modifications may be made without departing from the spirit and scope of the invention as defined in the appended claims.

What is claimed is:

1. In an electrically driven vehicle having a pair of independently rotatable wheels each driven by a DC reversible motor under the control of a manually movable joystick means and comprising:
 means for steering said vehicle including motor direction control means to control energization of said motors in dependence upon the relative position of said joystick means to effect relative rotation between said motors and, hence, said rotatable wheels,
 means for controlling the speed of movement of said chair including motor speeding control means for varying the motor speed of said motors over a range of speeds in accordance with the magnitude of a speed control signal, and
 speed control signal means for providing a said speed control signal and including radiant energy transmitting means for transmitting a radiant energy beam and receiver means for receiving said radiant energy beam and providing a said control signal of a magnitude in dependence upon the amount of energy received and means for varying the amount of transmitted energy that is received by said receiving means in dependence upon the relative position of said joystick means to thereby vary the speed of said vehicle, said transmitting means includes means for directing four radiant energy light beams with said beams defining four parallel axes located at the corners of a square and said receiving means including four light sensor means positioned to respectively receive an associated one of said light beams, said energy varying means including a single mask which is substantially flat and lies in a plane perpendicular to said light beams and means for moving said mask along said plane from a centered position relative to all of said light beams and in dependence upon the positioning of said joystick means.

2. In an electrically driven vehicle as set forth in claim 1, wherein said single mask is configured so that when it is located in said beam centered position, the said mask substantially completely interrupts all of said light beams.

3. In an electrically driven vehicle having a pair of independently rotatable wheels each driven by a DC reversible motor under the control of a manually movable joystick means and comprising:

means for steering said vehicle including motor direction control means to control energization of said motors in dependence upon the relative position of said joystick means to effect relative rotation between said motors and, hence, said rotatable wheels, means for controlling the speed of movement of said chair including motor speed control means for varying the motor speed of said motors over a range of speeds in accordance with the magnitude of a speed control signal, and speed control signal means for providing a said speed control signal and including radiant energy transmitting means for transmitting a radiant energy beam and receiver means for receiving said radiant energy beam and providing a said control signal of a magnitude in dependence upon the amount of energy received and means for varying the amount of transmitted energy that is received by said receiving means in dependence upon the relative position of said joystick means to thereby vary the speed of said vehicle, said transmitting means including means for directing four radiant energy light beams with said beams defining four parallel axes located at the corners of a square and said receiving means including four light sensor means positioned to respectively receive an associated one of said light beams, said mask being substantially flat and lying in a plane perpendicular to said light beams, said mask has a peripheral outline defining a square defined by peripheral sides angled at approximately 45° with respect to a square outline defined by imaginary lines interconnecting adjacent ones of said beams, the outer periphery of said mask being located outwardly with respect to said light beams so that when said joystick means is in its normal position the mask substantially completely interrupts said light beams and as said mask is displaced by said joystick means in any direction transverse to said light beams at least one of the light beams will be at least partially received by the light sensor means associated with that light beam.

4. In an electrically driven vehicle having a pair of independently rotatable wheels each driven by a DC reversible motor under the control of a manually movable joystick means and comprising:

means for steering said vehicle including motor direction control means to control energization of said motors in dependence upon the relative position of said joystick means to effect relative rotation between said motors and, hence, said rotatable wheels, means for controlling the speed of movement of said chair including motor speed control means for varying the motor speed of said motors over a range of speeds in accordance with the magnitude of a speed control signal and speed control signal means for providing a said speed control signal and including radiant energy transmitting means for transmitting a radiant energy beam and receiver means for receiving said radiant energy beam and providing a said control signal of a magnitude in dependence upon the amount of energy received and means for varying the amount of transmitted energy that is received by said receiving means in dependence upon the relative position of said joystick means to thereby vary the speed of said vehicle, said transmitting means including means for directing four radiant energy light beams with said beams defining four parallel axes located at the corners of a square and said receiving means including four light sensor means positioned to respectively receive an associated one of said light beams, said mask being substantially flat and lying in a plane perpendicular to said light beams, said mask has an opening defined therein with the peripheral edges of the opening defining a square lying in a plane transverse to said light beams, the peripheral edges of said aperture being angled at substantially 45° with respect to imaginary lines interconnecting the centers of said beams to define essentially a square configuration, said aperture being of a size such that said light beams are normally completely interrupted by said mask when said joystick means is in its normal position and as said joystick means is displaced in any direction transverse to said light beams, at least one of said light beams will be at least partially received by the light sensor associated with that light beam.

5. In an electrically driven vehicle having a pair of independently rotatable wheels each driven by a DC reversible motor under the control of a manually movable joystick means and comprising:

means for steering said vehicle including motor direction control means to control energization of said motors in dependence upon the relative position of said joystick means to effect relative rotation between said motors and, hence, said rotatable wheels, means for controlling the speed of movement of said chair including motor speed control means for varying the motor speed of said motors over a range of speeds in accordance with the magnitude of a speed control signal, and speed control signal means for providing a said speed control signal and including radiant energy transmitting means for transmitting a radiant energy beam and receiver means for receiving said radiant energy beam and providing a said control signal of a magnitude in dependence upon the amount of energy received and means for varying the amount of transmitted energy that is received by said receiving means in dependence upon the relative position of said joystick means to thereby vary the speed of said vehicle, said transmitting means including means for directing four radiant energy light beams with said beams defining four parallel axes located at the corners of a square and said receiving means including four light sensor means positioned to respectively receive an associated one of said light beams, said mask being substantially flat and lying in a plane perpendicular to said light beams, said joystick means carries switch actuator means, motor direction control switch means positioned to be actuated by said switch actuator means as said joystick means is displaced from its normal position, said switch means including a left forward switch means and a left reverse switch means, for when actuated, indicating that the motor means for the left wheel be driven in a forward or reverse direction and a right forward switch means and right reverse switch means for, when actuated, indicating that the motor for the right wheel be driven in a forward or reverse direction.

6. In an electrically driven vehicle having a pair of independently rotatable wheels each driven by a DC reversible motor under the control of a manually movable joystick means and comprising:

means for steering said vehicle including motor direction control means to control energization of said motors in dependence upon the relative position of said joystick means to effect relative rotation between said motors and, hence, said rotatable wheels, means for controlling the speed of movement of said chair including motor speed control means for varying the motor speed of said motors over a range of speeds in accordance with the magnitude of a speed control signal, and speed control signal means for providing a said speed control signal and including radiant energy transmitting means for transmitting a radiant energy beam and receiver means for receiving said radiant energy beam and providing a said control signal of a magnitude in dependence upon the amount of energy received and means for varying the amount of transmitted energy that is received by said receiving means in dependence upon the relative position of said joystick means to thereby vary the speed of said vehicle, said energy varying means includes means for mounting said transmitting means and said receiver means such that one of said last mentioned means is carried by said joystick means for movement therewith relative to the other of said last mentioned means.

7. In an electrically driven vehicle as set forth in claim 6 wherein said energy transmitting means includes light source means for directing a single light beam along a path in the direction of said receiver means, said receiving means including a plurality of light sensor means positioned so that each receives a variable amount of light from said light source means in dependence upon the direction and extent of the displacement of said joystick means from its neutral position.

8. In an electrically driven vehicle as set forth in claim 7, including logic circuit means for providing control signals for use in controlling both motor speed and direction in dependence upon the relative magnitudes of light received by said sensor means.

9. In an electrically driven vehicle as set forth in claim 6, wherein said transmitting means includes means for directing a single light beam toward said receiver means and said receiver means includes a single light sensor means for providing an output signal which varies in magnitude in dependence upon the amount of radiant energy received.

10. A motor control system for controlling motor direction and speed of at least one reversible DC motor and comprising a movable direction command member having at least a neutral position and movable therefrom in opposite directions to forward and reverse positions respectively indicative of forward and backward motor direction; motor direction control means responsive to said forward and reverse movements of said command member for respectively controlling said DC motor to rotate in forward and backward directions; and motor speed control means for controlling the motor speed over an increasing range of speeds as said command member is moved away from said neutral position and including motor speed control circuit means for varying the motor speed in dependence upon the magnitude of a speed control signal, means for providing a speed control signal which varies in magnitude as a function of the displacement of said command member means from its neutral position and including radiant energy transmitting means for transmitting a beam of radiant enerby and receiving means for receiving said energy and developing a said control signal having a magnitude in dependence upon the magnitude of energy received, and means for varying the amount of energy received by said receiving means in dependence upon the displacement of said command member to thereby vary the magnitude of said speed control signal, said energy varying means includes means mounting said transmitting means and said receiving means in such a manner that one of said last mentioned means is secured to said joystick means for movement therewith relative to the other of said last mentioned means so as to vary the amount of energy received by said receiving means in dependence upon the relative position of said joystick means.

* * * * *